United States Patent
Lellig et al.

(10) Patent No.: US 9,604,433 B2
(45) Date of Patent: Mar. 28, 2017

(54) PVB FILM WITH LOW-MIGRATION UV PROTECTION

(71) Applicant: KURARAY EUROPE GMBH, Hattersheim (DE)

(72) Inventors: Philipp Lellig, Troisdorf (DE); Uwe Keller, Bonn (DE)

(73) Assignee: KURARAY EUROPE GMBH, Hattersheim (DE)

( * ) Notice: Subject to any disclaimer, the term of this patent is extended or adjusted under 35 U.S.C. 154(b) by 90 days.

(21) Appl. No.: 14/688,046

(22) Filed: Apr. 16, 2015

(65) Prior Publication Data
US 2015/0321453 A1    Nov. 12, 2015

(30) Foreign Application Priority Data

May 7, 2014 (EP) .................... 14167328

(51) Int. Cl.
*B32B 17/10* (2006.01)
*B32B 17/00* (2006.01)
(Continued)

(52) U.S. Cl.
CPC ........ *B32B 17/10678* (2013.01); *B32B 17/00* (2013.01); *B32B 17/10036* (2013.01);
(Continued)

(58) Field of Classification Search
CPC .............. B32B 17/00; B32B 17/10678; B32B 17/10761; B32B 2605/18; B32B 2457/206;
(Continued)

(56) References Cited

U.S. PATENT DOCUMENTS

| 5,618,863 A | 4/1997 | D'Errico et al. |
| 7,312,275 B2 | 12/2007 | Papenfuhs et al. |

(Continued)

FOREIGN PATENT DOCUMENTS

| EP | 1527107 B1 | 5/2005 |
| EP | 1606325 B1 | 5/2009 |

(Continued)

OTHER PUBLICATIONS

STIC Search Report dated Aug. 25, 2016.*
(Continued)

*Primary Examiner* — Eisa Elhilo
(74) *Attorney, Agent, or Firm* — Brooks Kushman P.C.

(57) ABSTRACT

Polyvinylacetal films exhibiting high UV absorbance, freedom from cloudiness, and low tendency for UV stabilizer migration use, as a UV absorber, one or more UV absorbers of the formulae (1a), (1b), (2) or (3) in films formed from plasticizer-containing polyvinyl acetal (Continued)

-continued

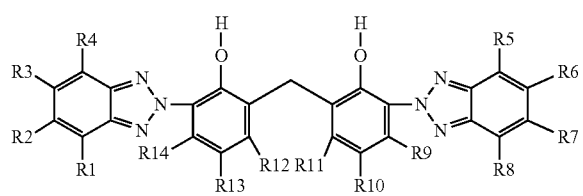

(1b)

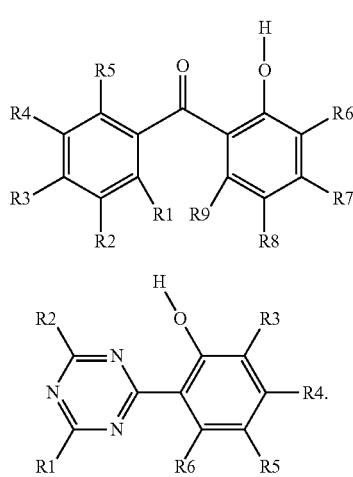

(2)

(3)

12 Claims, 1 Drawing Sheet

(51) Int. Cl.
C08J 5/18 (2006.01)
C08K 5/3467 (2006.01)
C08J 3/20 (2006.01)

(52) U.S. Cl.
CPC ......... *B32B 17/10761* (2013.01); *C08J 3/203* (2013.01); *C08J 5/18* (2013.01); *C08K 5/3467* (2013.01); *B32B 2419/00* (2013.01); *B32B 2457/12* (2013.01); *B32B 2457/20* (2013.01); *B32B 2457/206* (2013.01); *B32B 2605/08* (2013.01); *B32B 2605/18* (2013.01); *C08J 2329/14* (2013.01); *Y10T 428/3163* (2015.04)

(58) Field of Classification Search
CPC .... C08K 5/3475; C08K 5/132; C08K 5/3492; Y10T 428/3163
See application file for complete search history.

(56) References Cited

U.S. PATENT DOCUMENTS

| | | | |
|---|---|---|---|
| 7,358,304 B2 | 4/2008 | Papenfuhs et al. | |
| 7,511,096 B2 | 3/2009 | Papenfuhs et al. | |
| 7,528,192 B2 | 5/2009 | Papenfuhs et al. | |
| 2012/0052310 A1* | 3/2012 | Keller | A01G 9/1438 |
| | | | 428/437 |

FOREIGN PATENT DOCUMENTS

WO    03/020776 A1    3/2003
WO    2004/063231 A1    7/2004

OTHER PUBLICATIONS

European Patent Office Search Report for EP Application No. EP14167328 (No English Translation), completed by the European Patent Office on Oct. 9, 2014, All together 4 Pages.

* cited by examiner

PVB FILM WITH LOW-MIGRATION UV PROTECTION

CROSS-REFERENCE TO RELATED APPLICATIONS

This application claims priority to European Patent Application No. 14167328.5 filed May 7, 2014, the disclosure of which is incorporated in its entirety by reference herein.

BACKGROUND OF THE INVENTION

1. Field of the Invention

The invention relates to plasticiser-containing films based on polyvinyl acetal with UV stabilisers that have a low tendency toward migration, and glass laminates produced therewith.

2. Background Art

Commercially available plasticiser-containing polyvinyl butyral film (PVB film) for laminated glazings has been provided with UV absorbers for many decades so that UV radiation cannot penetrate through the laminated glass completely, in contrast to visible light. Protection against harmful UV radiation for individuals or objects located behind the laminated glass can thus be ensured in a simple manner. Besides the protection against cuts, this constitutes the main property advantage compared with monolithic glass, since such glass is largely transparent to UV radiation.

Derivatives or dimers of 2 hydroxyphenylbenzotriazole have proven their worth and are used in a widespread manner as UV absorbers and are obtainable using different substitution patterns, for example under the trade names Tinuvin P, Tinuvin 328, Tinuvin 327, Tinuvin 326 and Tinuvin 360.

Furthermore, derivatives of 2-hydroxybenzophenone are suitable as UV absorbers and are obtainable using different substitution patterns, for example under the trade names Mark LA 51, Seesorb 1000, Uvinul 30340, Uvinul 400, Cyasorb UV-24, Uvinul 3008 and Chimasorb 125.

In addition, derivatives of 2-hydroxyphenyltriazine are suitable as UV absorbers and are obtainable using different substitution patterns, for example under the trade names Tinuvin 1577 and Cyasorb UV-1164.

Compounds of this type are sketched in the general Formulas 1a, 1b, 2 and 3 and are known in PVB film for their excellent long-term stability, good solubility and high absorption capacity in almost the entire UV range. Furthermore, the specified UV absorbers can be introduced particularly easily into the film compound during the extrusion process since they are also relatively well soluble even in the plasticisers used conventionally, such as 3G8, and can thus be easily added to the plasticiser before extrusion. In addition, the above-mentioned UV absorbers have melting points that lie significantly below the extrusion temperature conventional with PVB film of approximately 200° C. These solubility and melting properties of the specified UV absorbers are promoted by the relatively low molecular weight thereof. This, together with the good solubility in the film matrix, also leads however to a high migration ability therein. Particularly in the field of architecture, laminated safety glass (LSG), once installed, is only replaced in some circumstances after a number of decades, such that permanent UV protection cannot be maintained with creeping loss of UV absorber via the open edges of the LSG.

The migration ability also not only has the disadvantage of reducing or completely eliminating the UV protective function associated with the UV absorber due to a loss of said absorber. The migration of the UV absorber is additionally disadvantageous when a film containing UV absorber is used in direct contact with a film free from UV absorber or a material free from UV absorber. In such an arrangement the UV absorber capable of migration may, over time, enter the layer initially free from UV absorber, may damage this layer as a result, or may trigger undesirable effects, such as clouding, disolouration or the loss of a certain functionality.

In order to reduce or completely prevent the migration of the UV absorber, insoluble UV absorbers with high molecular weight or high melting points, which lie above the usual extrusion temperature of approximately 200° C., can be used. These UV absorbers indeed have a lower tendency toward migration, but cause increased clouding in the film, which is produced by agglomeration of undissolved and non-uniformly distributed UV absorbers in the film matrix.

SUMMARY OF THE INVENTION

The problem addressed by the present invention was to provide an adhesive film for laminated glass, which adhesive film is stabilised with respect to UV radiation, has low UV transmission, a low yellow value and also a low clouding, and of which the UV absorber at the same time has a low tendency toward migration. It has now been surprisingly and uexpectedly discovered that, with use of a UV absorber in the form of a salt derived from an organic UV absorber of the 2-hydroxybenzotriazole (1a, 1b), 2-hydroxybenzophenone (2) or 2-hydroxyphenyltriazine (3) type, a film that is free from clouding after lamination and that has low UV transmission and low yellow value can be obtained. The absence of clouding is particularly surprising, since the salt would be expected to agglomerate or remain undissolved in the relatively unpolar polymer/plasticiser mixture and to form optically disturbing particles in the film matrix.

DETAILED DESCRIPTION OF THE PREFERRED EMBODIMENT(S)

Figure 1:
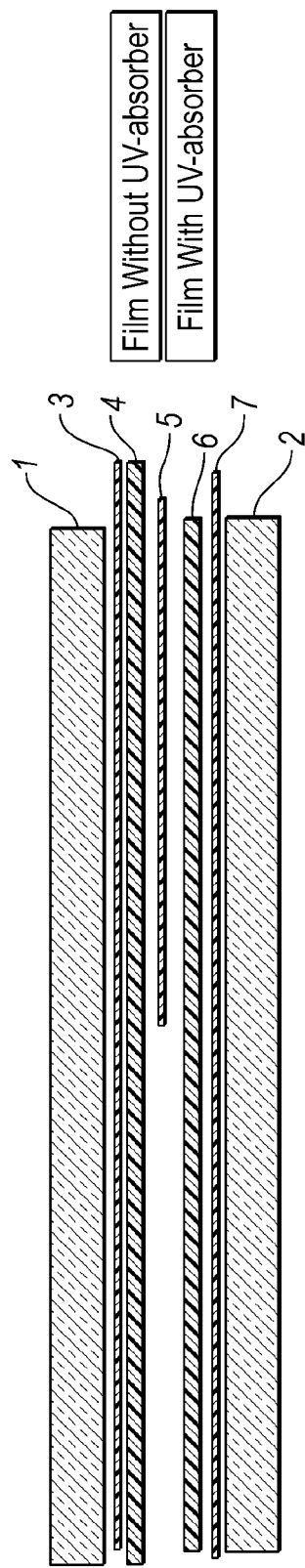
FIG. 1 illustrates an autoclavable stack containing PVB layers with and without UV absorber suitable for assessing interfilm UV absorber migration.

The present invention therefore relates to a film containing at least one polyvinyl acetal, at least one plasticiser and 0.01-1.5% by weight of a UV absorber selected from the compounds of Formulas (1a), (1b), (2) or (3)

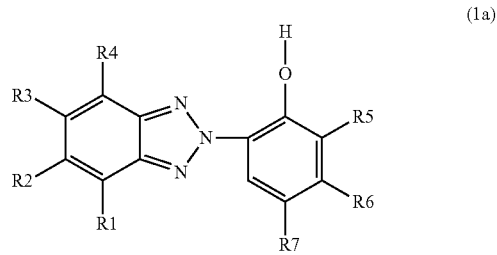

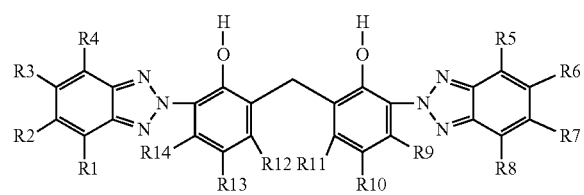

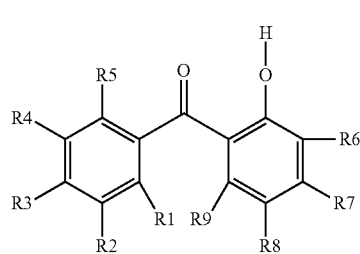

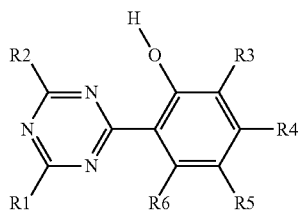

where R1, R2, R3, R4, R5, R6, R7, R8, R9, R10, R11, R12, R13, R14=H, halogen, or, alkyl, hydroxyalkyl, alkoxyalkyl or acyloxyalkyl groups, in each case with 1-20 carbon atoms, and in each case unsubstituted or substituted by aldehyde, keto or epoxy groups, with the provision that at least one of the groups R1, R2, R3, R4, R5, R6, R7, R8, R9, R10, R11, R12, R13, R14 carries a carboxyl group, sulfoxy group or phosphate group with an alkali ion, alkaline earth ion or ammonium ion as a counterion.

UV absorbers according to Formula 4 are preferably used, which are derived from UV absorbers of the 2-hydroxylbenzotriazole type:

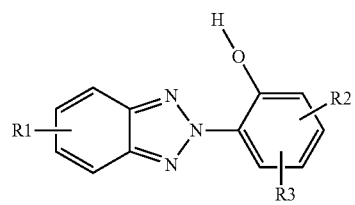

wherein R1, R2 and R3 have the specified meanings.

UV absorbers according to Formula 5 are most preferably used,

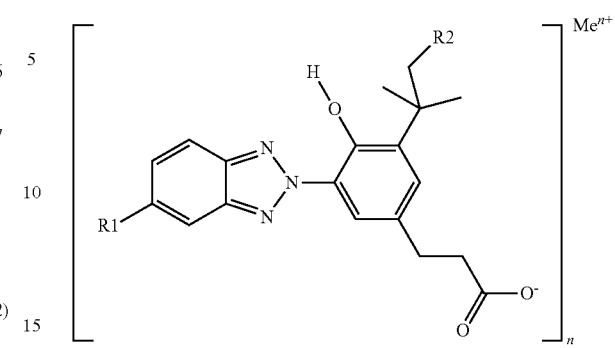

where R1=H or halogen, R2=H or $CH_3$ and $Me^{n+}$=$Li^+$, $Na^+$, $K^+$, $Mg^{2+}$, $Ca^{2+}$, $Zn^{2+}$, or $NH_4^+$.

Films according to the invention most preferably contain a UV absorber in the form of an alkali, alkaline earth or ammonium salt, derived from the compound 3-(2H-benzotriazol-2-yl)-5-(1,1-dimethyl)-4-hydroxybenzolpropanoic acid, CAS no. 84268-36-0 or the compound 3-(5-chloro-2H-benzotriazol-2-yl)-5-(1,1-dimethyl)-4-hydroxybenzolpropanoic acid, CAS no. 83573-67-5.

These UV absorbers are commercially obtainable for example from the company Everlight under the trade names Eversorb R01 and Eversorb R04.

The invention also relates to a method for producing a film as defined above by mixing polyvinyl acetal, at least one plasticiser and at least one of the specified UV absorbers according to Formulas 1a, 1b, 2, 3 or 4 in solid form in a mixing apparatus and by subsequently extruding the obtained mixture.

Mixers, extruders or kneaders can be used as a mixing apparatus. Extruders in which the obtained mixture is extruded by means of a sheet die to form the film are suitable in particular. Here, the mixing may take place in the front part of the extruder, wherein the melting and shaping occurs in the further part of the extruder.

Here, the UV absorber present in solid form can be fed for example directly as powder or granulate into the feed region of an extruder. The UV absorber present in solid form may optionally also be fed after being premixed with a polyvinyl acetal present in the form of powder or granulate.

The UV absorber is preferably fed to the mixing apparatus in a form suspended in a carrier liquid such as the plasticiser or water.

Films according to the invention preferably contain at least one UV absorber according to Formulas 1a, 1b, 2, 3 or 4 in a quantity from 0.01 to 1.5% by weight, more preferably in a quantity from 0.05 to 0.80% by weight, and most preferably in a quantity from 0.10 to 0.50% by weight.

In a second variant of the invention the films additionally contain at least one antioxidant in a quantity from 0.005 to 0.5% by weight.

With the inventive use of the selected UV absorbers, the film material is subjected to a reduced proportion of UV-A radiation. This may mean that yellow-coloured decomposition products originating from specific antioxidants are no longer bleached by UV radiation. Antioxidants that do not form such degradation products, such as antioxidants that do not contain a (3,5-di-tert-butyl-4-hydroxyphenyl)propionate partial structure or a structure of the Hostanox 03 type, are therefore preferably used. Antioxidants that contain these partial structures already tend toward yellowing to some extent during the extrusion process.

In a variant of the invention the film contains less than 1500 ppm of antioxidants of Formula (6) or having the partial structure (3,5-di-tert-butyl-4-hydroxyphenyl)propionate or the partial structure of the Hostanox 03 type.

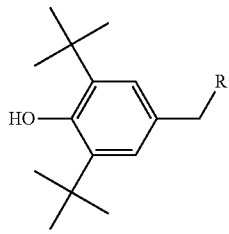
(6)

where R=a hydrocarbon radical of a polyfunctional alcohol, an oligoglycol with 1 to 10 glycol units, a hydrocarbon group with 1 to 20 carbon atoms, an N, P, S-substituted hydrocarbon group with 1 to 30 carbon atoms, or a carboxylic acid ester group with 1 to 30 carbon atoms in the alcohol group of the ester.

The film of the invention preferably contains the specified antioxidants only in a low proportion, that is to say preferably no more than 1000 ppm, more preferably no more than 500 ppm, yet more preferably no more than 250 ppm, still more preferably no more than 100 ppm, and most preferably no more than 50 ppm. The film of the invention most preferably does not contain the specified antioxidants at all, that is to say 0 ppm.

Examples of compounds of Formula (6) which are not used or which are only used in the specified proportions are those having the following CAS numbers: 2082-79-3, 12643-61-0, 35074-77-2, 23128-74-7, 976-56-7, 65140-91-2, 1709-70-2, 34137-09-2, 27676-62-6, 6683-19-8, 41484-35-9, 991-84-4, 63843-89-0, 4221-80-1 or 67845-93-6.

Further examples of compounds of Formula (6) which are not used or which are only used in the specified proportions are those according to the following structural formulas:

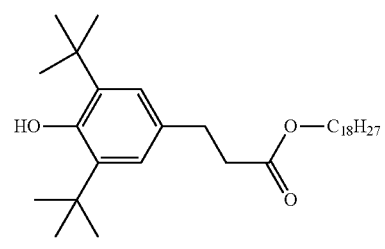

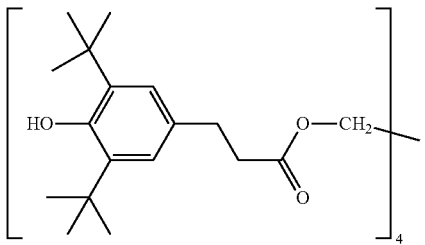

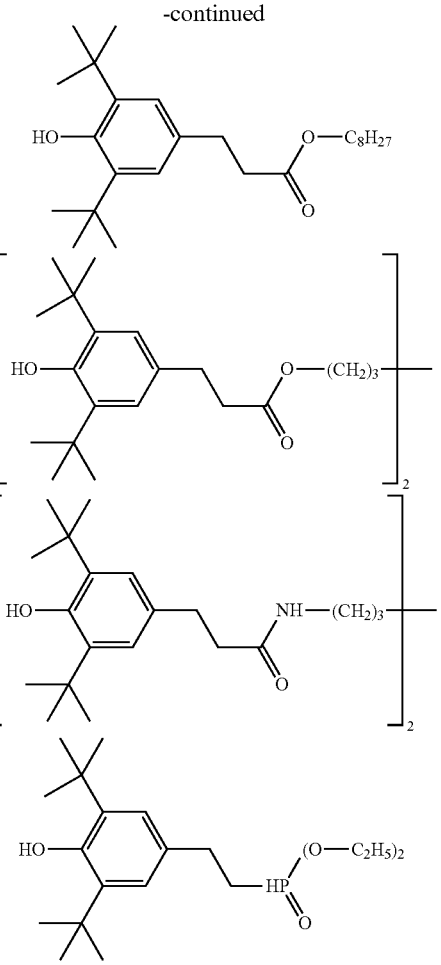

Compounds of this type can be found for example in the "Plastics Additives handbook" 5th Edition, Hanser publishing house, in the chapter "Primary antioxidants".

In a fourth variant of the invention antioxidants which do not contain the partial structure (3,5-di-tert-butyl-4-hydroxyphenyl)propionate or the structure of the Hostanox 03 type can be contained in the film in a quantity from 0.005 to 0.5% by weight, preferably 0.02 to 0.15% by weight and most preferably 0.03 to 0.1% by weight.

Such suitable antioxidants are, for example, compounds of Formula (6) or binuclear phenolic antioxidants of the Lowinox 44B25 or Irganox 129 type, mononuclear antioxidants of the Songsorb 2908 (CAS: 67845-93-6), BHT (CAS: 128-37-0), or p-octylphenol type, or multi-nuclear phenolic antioxidants, such as Topanol CA (CAS: 1843-03-4) or Wingstay L (31851-03-3).

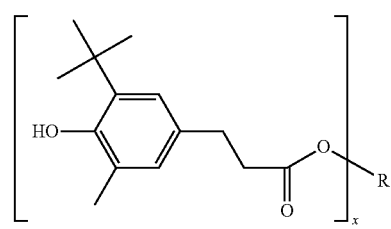
(6)

where R=hydrocarbon radical of a polyfunctional alcohol, oligoglycols with 1 to 10 glycol units, or hydrocarbon group with 1 to 20 carbon atoms and x=1, 2, 3 or 4.

Phenolic antioxidants which contain one or more sulphur atoms, but do not contain the partial structure (3,5-di-tert-butyl-4-hydroxyphenyl)propionate or the partial structure of the Hostanox 03 type, can likewise be considered.

Antioxidants according to Formula (6) may be, in particular, triethylene glycol-bis-3-(3-tert-butyl-4-hydroxy-5-methylphenyl)propionate, CAS no. 36443-68-2. This is commercially obtainable for example from Songwon as "Songnox 2450" or from BASF SE as "Irganox 245".

Of course, further similar structures which can be used accordingly within the scope of the invention can be generated in a simple manner by variation of the substituents.

At the same time, the yellowness value (db) of films according to the invention is less than 2, preferably less than 1.5, more preferably less than 1, still more preferably less than 0.6, and most preferably less than 0.4. The yellowness value (db) of the films according to the invention is determined on a laminate consisting of the film with a thickness of 0.76 mm between two panes of clear glass having a thickness of 2 mm. The colour contribution of the glass is measured by measuring an identical glass pair without film as reference.

The yellowness of the film can also be determined by the transmission of the film in accordance with EN 410 at 430 nm. In particular, films of the invention, with a thickness of 0.76 mm in a laminate between two panes of clear glass (for example Planilux®) each having a thickness of 2 mm, therefore have a light transmission at 430 nm according to EN 410 of greater than 75%, more preferably, in order of increasing preference, of greater than 80%, 85%, 86%, 87% or 88%.

The yellowness value (db) or the transmission according to EN 410 at 430 nm of films having a different thickness can be determined at the reference thickness 0.76 after careful working (for example laminating 2×0.38 mm films above one another, pressing a film 1.52 mm thick to the thickness 0.76, peeling from, or up to, the thickness 0.76).

In addition to the use of suitable UV absorbers and antioxidants, the setting of a low alkali titre of the films according to the invention can result in improved natural colour and photothermal stability of the film according to the invention.

The alkali titre, as specified in the examples, is determined by neutralisation of the film according to the invention with hydrochloric acid and is preferably between 2 and 70, in particular between 3 and 50, and most preferably between 5 and 30.

The alkali titre can be set by corresponding neutralisation of the polyvinyl acetal during or after production thereof by acetalisation of polyvinyl alcohol or by addition of metal salts to the mixture according to the invention. With the use of the films according to the invention for laminated glass laminates, the metal salts generally also act as anti-stick agents.

Films according to the invention may contain alkaline earth metal ions, zinc ions, aluminium ions or alkali metal ions as anti-stick agents. These are present in the mixture/film in the form of salts of monovalent or polyvalent inorganic or monovalent or polyvalent organic acids. Examples of counterions include, for example, salts of organic carboxylic acids, such as formates, acetates, trifluoracetates, propionates, butyrates, benzoates, 2-ethylhexanoates etc., wherein carboxylic acids with fewer than 12 C atoms, preferably fewer than 8, more preferably fewer than 6, yet more preferably fewer than 4, and most preferably with fewer than 3 C atoms are preferably used. Examples of inorganic counterions include chlorides, nitrates, sulphates and phosphates. Further counterions may be anions associated with the surfactants, such as sulfonate or phosphate surfactants.

The film according to the invention preferably contains more than 5 ppm, more preferably more than 10 ppm, yet more preferably more than 15 ppm, still more preferably more than 20 ppm, and most preferably more than 25 ppm of ions selected from the group Be, Mg, Ca, Sr, Ba, zinc and aluminium. On the other hand, however, no more than 250 ppm of the specified polyvalent metals should be contained in the film in order to avoid undesired clouding.

At the same time, the content of alkali metal ions (Li, Na, K, Rb, Cs, Fr) in the plasticiser-containing film based on polyvinyl acetal is to be as low as possible. The film preferably contains less than 150 ppm, more preferably less than 100 ppm, yet more preferably less than 75 ppm, still more preferably less than 50 ppm, yet still more preferably less than 25 ppm, even more preferably less than 10 ppm, and most preferably less than 5 ppm of alkali metal ions.

The polyvinyl acetals used in accordance with the invention are obtainable as acetalisation products of polyvinyl alcohol (PVA) with aldehydes, such as butyraldehyde. Films according to the invention may contain one or more polyvinyl acetals, which can differ in terms of molecular weight, degree of acetalisation, residual alcohol content or number of carbon atoms in the acetal group.

In addition to the use of the UV absorber and the use of phenolic antioxidants not tending toward yellowing, the films according to the invention can be provided with one or more light stabilisers, in particular with sterically hindered amines of the HALS type and/or sterically hindered aminoethers (NOR-HALS).

Films according to the invention preferably contain 0.005-1% by weight, more preferably 0.01-0.5% by weight, in particular 0.03-0.3% by weight and most preferably 0.05-0.25% by weight, of sterically hindered amines of the HALS or NOR-HALS type as light stabilisers.

Compounds of this type are commercially obtainable, for example through the products Tinuvin 123 (NOR-HALS), Tinuvin 144, Tinuvin 622, Tinuvin 770 and the di-N-methylated derivative thereof from BASF (Ciba Specialities). For example, Songlight 2920 from Songwon International, ADK Stab LA-57, LA-52 or LA-62 from Asahi Denka Co., or UVINUL 4050 H from BASF SE are particularly well suited.

In order to produce polyvinyl acetal, polyvinyl alcohol is dissolved in water and is acetalised with an aldehyde, such as butyraldehyde, formaldehyde or propionaldehyde, with addition of an acid catalyst. The precipitated polyvinyl acetal is separated off, washed neutral, optionally suspended in an aqueous medium set to an alkaline pH, then washed neutral again and dried.

The acid used for acetalisation must be neutralised again after the reaction. A low content of alkali metal ions can be achieved, inter alia, with the synthesis of the polyvinyl acetal by dispensing with the sodium hydroxides or potassium hydroxides or carbonates used conventionally to neutralise the catalyst or by thorough washing of the polyvinyl acetal obtained with the acetalisation. Alternatively to the bases NaOH or KOH, the catalyst acid from the acetalisation step can be neutralised for example by injecting carbon dioxide or ethylene oxide.

The polyvinyl alcohol content of the polyvinyl acetal can be set by the quantity of the aldehyde used in the acetalisation.

It is also possible to carry out the acetalisation with other or more aldehydes with 2-10 carbon atoms (for example valeraldehyde).

The films based on plasticiser-containing polyvinyl acetal preferably contain uncrosslinked polyvinyl butyral (PVB), which is obtained by acetalisation of polyvinyl alcohol with butyraldehyde.

The use of crosslinked polyvinyl acetals, in particular crosslinked polyvinyl butyral (PVB) is also possible. Suitable crosslinked polyvinyl acetals are described for example in EP 1527107 B1 and WO 2004/063231 A1 (thermal self-crosslinking of polyvinyl acetals containing carboxyl groups), EP 1606325 A1 (polyvinyl acetals crosslinked with polyaldehydes) and WO 03/020776 A1 (polyvinyl acetals crosslinked with glyoxylic acid). The disclosure of these patent applications is hereby incorporated fully by reference.

Within the scope of the present invention, terpolymers formed from hydrolysed vinyl acetate/ethylene copolymers can also be used as polyvinyl alcohol. These compounds are generally hydrolysed to more than 98 mol % and contain 1 to 10% by weight of units based on ethylene (for example "Exceval" type from Kuraray Europe GmbH).

Within the scope of the present invention, hydrolysed copolymers formed from vinyl acetate and at least one further ethylenically unsaturated monomer can also be used as polyvinyl alcohol.

Within the scope of the present invention, the polyvinyl alcohols may be used in pure form or in the form of a mixture of polyvinyl alcohols having a different degree of polymerisation or degree of hydrolysis.

Besides the acetal units, polyvinyl acetals also contain units resulting from vinyl acetate and vinyl alcohol. The polyvinyl acetals used in accordance with the invention have a polyvinyl alcohol content of 12-24% by weight, preferably 14-23% by weight, more preferably 16-22% by weight, yet more preferably 17-21% by weight, and in particular, 18-20% by weight.

The polyvinyl acetate content of the polyvinyl acetal used in accordance with the invention is preferably below 5% by weight, more preferably below 3% by weight, yet more preferably below 1% by weight, still more preferably below 0.75% by weight, even more preferably below 0.5% by weight, and in particular below 0.25% by weight.

The degree of acetalisation can be calculated from the polyvinyl alcohol proportion and the residual acetate content.

The films preferably have a total plasticiser content, that is to say the proportion of all plasticisers in the film, in order of increasing preference, in the range of 5-45% by weight, 12-36% by weight, 14-32% by weight, 16-30% by weight, and in particular 20-28% by weight. Films according to the invention or laminates bonded therewith may contain one or more plasticisers.

Well-suited plasticisers for the films according to the invention include one or more compounds selected from the following group: di-2-ethylhexyl sebacate (DOS), di-2-ethylhexyl adipate (DOA), dihexyl adipate (DHA), dibutyl sebacate (DBS), triethylene glycol-bis-n-heptanoate (3G7), tetraethylene glycol-bis-n-heptanoate (4G7), teriethylene glycol-bis-2-ethylhexanoate (3GO or 3G8), tetraethylene glycol-bis-n-2-ethylhexanoate (4GO or 4G8), di-2-butoxyethyl adipate (DBEA), di-2-butoxyethoxyethyl adipate (DBEEA), di-2-butoxyethyl sebacate (DBES), di-2-ethylhexyl phthalate (DOP), di-isononyl phthalate (DINP), tri-ethylene glycol-bis-isononanoate, triethylene glycol-bis-2-propyl hexanoate, tris(2-ethylhexyl)phosphate (TOF), 1,2-cyclohexane dicarboxylic acid diisononyl ester (DINCH), diisononyl adipate (DINA) and dipropylene glycol benzoate.

Plasticisers of which the polarity, expressed by the formula $100 \times O/(C+H)$, is less than/equal to 9.4 are most particularly suited as plasticisers for the films according to the invention, wherein O, C and H stand for the number of oxygen, carbon and hydrogen atoms in the respective molecule. The following table shows plasticisers that can be used in accordance with the invention and the polarity values thereof according to the formula $100 \times O/(C+H)$.

| Name | Abbreviation | $100 \times O/(C + H)$ |
| --- | --- | --- |
| di-2-ethylhexyl sebacate | (DOS) | 5.3 |
| diisononyl adipate | (DINA) | 5.3 |
| 1,2-cyclohexane dicarboxylic acid diisononyl ester | (DINCH) | 5.4 |
| di-2-ethylhexyl adipate | (DOA) | 6.3 |
| dihexyl adipate | (DHA) | 7.7 |
| dibutyl sebacate | (DBS) | 7.7 |
| triethylene glycol-bis-2-propyl hexanoate | | 8.6 |
| triethylene glycol-bis-i-nonanoate | | 8.6 |
| di-2-butoxyethyl sebacate | (DBES) | 9.4 |
| triethylene glycol-bis-2-ethylhexanoate | (3G8) | 9.4 |

Furthermore, the mixtures or films according to the invention may additionally contain further additives, such as antistatic agents, fillers, IR-absorbing nanoparticles or chromophores, dyes, surface-active substances, bleaching agents, stabilisers, acid/base buffers, chelating agents, compounds containing epoxy groups, pigments and adhesion regulators.

Films of the invention can be used to produce laminated glass, that is to say to bond at least two glass panes or as a ply connecting a glass pane to a further transparent rigid or flexible layer. Such glazings can be used advantageously where there is a need for good UV protection with simultaneously high transparency in the visible range of light, for example in office buildings, public buildings such as schools and museums, display window glazing, motor vehicles (windscreens, side glazing, glass roofs and rear windows) or aircraft glazing. The films of the invention can also be used as an LSG component in the interior of office buildings, restaurants, bathrooms, public toilets, etc. In particular, the films according to the invention can also be used in functional components, such as photovoltaic modules (particularly for those with organic solar cells), display applications (LED or OLED screens, televisions, computer screens, big screens), and switchable glass elements (particularly electrochromic, photochromic and photoelectrochromic glass elements or glass elements of the suspended particle device type or thermotropic glass elements).

In the specified functional components, at least one layer of the film according to the invention protects an active layer located therebehind against damage caused by sunlight or UV radiation. In the case of photochromic layers, the response behaviour thereof additionally can be modified by filtering out the UV proportion of the solar radiation, the response behaviour then being influenced more heavily by visible light than by UV radiation.

Test and Measurement Methods:

The irradiation properties (light transmittance TL, UV transmittance TUV, each expressed in %) of the film laminated between 2×2.1 mm Planilux® in a thickness of 0.76 mm were determined in accordance with DIN EN 410 (2011) using a Perkin-Elmer Lambda 950 UV/VIS spectrometer.

To determine the yellowness value of the extruded film, a laminated glass with film of thickness 0.76 mm with two panes of 2.1 mm Planilux® was measured using the Color-Quest XE set to Hunterlab 2°/C. In the method, the natural colour of the glass is subtracted by measuring the two panes of identical glass batch as zero sample, and the contribution of the intermediate layer to the yellow colouring is established numerically as the yellowness value db.

Figure 2:
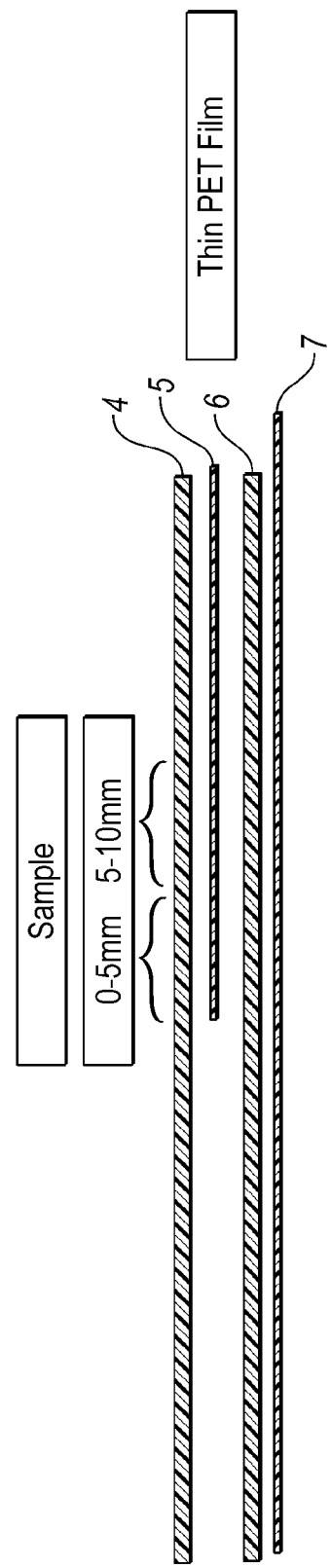
FIG. 2 illustrates where the measurement of UV absorber takes place, following separation of a film stack from an autoclaved and stored stack of FIG. 1.

To compare the migration behaviour of UV absorbers in PVB film, the following approach was adopted:

A PVB film 0.76 mm thick was produced using the same plasticiser as in the film, which contains the UV absorber to be tested. This film serves as a migration sink and is initially free from UV absorber. This film and the film with the UV absorber to be tested were then combined as follows to form a sandwich (FIG. 1):

1 2 mm glass layer as supporting element
3 PET film 100-200 μm thick as supporting element
4 film without UV absorber
5 PET film approximately 50 μm thin (for example Southwall XIR 75): over half the area
6 film with UV absorber
7 PET film 100-200 μm thick as supporting element
2 2 mm glass layer as supporting element The glasses (1,2) and the two outer layers of PET (3,7) serve here merely to enable a normal composite production inclusive of an autoclave step, but simultaneously to ensure simplified sample preparation by removal of the outer PET. Due to the provision of the thin PET film over half the area, the two PVB films (4,6) are directly glued to one another in one half of the film stack, whereas they are separated in the other side of the film stack by the thin PET film (5). Here, the thin PET film (5) functions in this half as a migration barrier for plasticiser and UV absorber. After production of a pre-composite in a vacuum bag conventional in the industry, the test laminates are subjected to a conventional autoclave process with a total duration of 90 minutes, a maximum pressure of 12 bar and a maximum temperature of 140° C. maintained over 30 minutes. The test laminates are then initially stored at RT for a sufficiently long period of time (for example 48 h) in order to prevent air from bubbling out again. The test laminates are then stored for 4 weeks in a hot cupboard at 100° C. The migration of UV absorber from the PVB layer (6) containing the UV absorber into the PVB layer (4) free from the UV absorber takes place during this period. By removing a film sample from the originally UV-absorber-free PVB layer at a defined distance from the edge of the thin PET film (0-5 mm, FIG. 2) and quantifying the migrated UV absorber, it is possible to determine the migration tendency comparatively. The quantification is performed with the aid of gas chromatography analysis or photometrically with use of specific absorption bands of the UV absorber in question.

EXAMPLES

Films were produced using the mixtures having the compositions specified in the following tables and were processed and tested as a laminate between 2 glass panes of the Planilux® type 2.1 mm thick. The extrusion temperature in all cases was 200° C. In Comparative Example 2, the UV absorber could be dissolved in the plasticiser and added to the extrusion mixture. In Example 1 the UV absorber was merely suspended in the plasticiser.

The UV absorber in Example 1 was produced in the following manner: The commercially obtainable UV absorber Eversorb R01 was dissolved in ethanol and mixed with an equimolar quantity of 0.5 molar, ethanolic calcium hydroxide solution. The calcium carboxylate thus obtained, referred to hereinafter as K—R01, was obtained in powder form by evaporating off the solvent.

In comparison to Comparative Example 2, Example 1 demonstrates a very favourable compromise of low yellowness value and low UV transmission. The UV absorber used in accordance with the invention tends much less toward migration than that of Comparative Example 2. Surprisingly, a very low haze value was also additionally obtained, although the UV absorber according to the invention was used undissolved as suspension in the used plasticiser.

The abbreviations in the table have the following meanings

PVB polyvinyl butyral

3G8 triethylene glycol-bis-2-ethyl hexanoate

DBEA di-2-butoxy ethyl adipate (possibly in a mixing ratio by weight with 3G8)

TL light transmittance TL in accordance with EN 410 (380-780 nm)

db yellowness value db established via Colorquest XE (a) measurements in % by weight are based on the film

TABLE 1

| | Example 1 | Comparison 2 |
|---|---|---|
| UV-absorber type | K-R01 | UVA 328 |
| thickness of the extruded film | 0.76 mm | 0.76 mm |
| PVB (Mowital F1) | 72.5 | 72.5 |
| plasticiser 3G8 | 25 | 25 |
| plasticiser DBEA | 2.5 | 2.5 |
| K-R01 | 0.15 | |
| Tinuvin 328 | | 0.15 |
| Mg-Acetate × 4 H2O | 0.0375 | 0.0375 |
| Irganox 245 | 0.0365 | 0.0365 |
| BHT | 0.05 | 0.05 |
| Light transmittance TL [EN410] | 89.6 | 91.5 |
| Colorquest yellowness value db | 0.21 | 0.17 |
| clouding haze | 0.15 | 0.12 |
| UV transmission (300-380; EN410: 2011) in % | 0.60 | 0.33 |
| UVA % by weight in zone 0-5 mm | 0.0265 | 0.0684 |
| UVA % relative to original concentration in source film | 18% | 46% |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A film, containing at least one polyvinyl acetal, at least one plasticiser and 0.01-1.5% by weight of at least one UV absorber selected from the group consisting of compounds of Formulas (1a), (1b), (2) and (3)

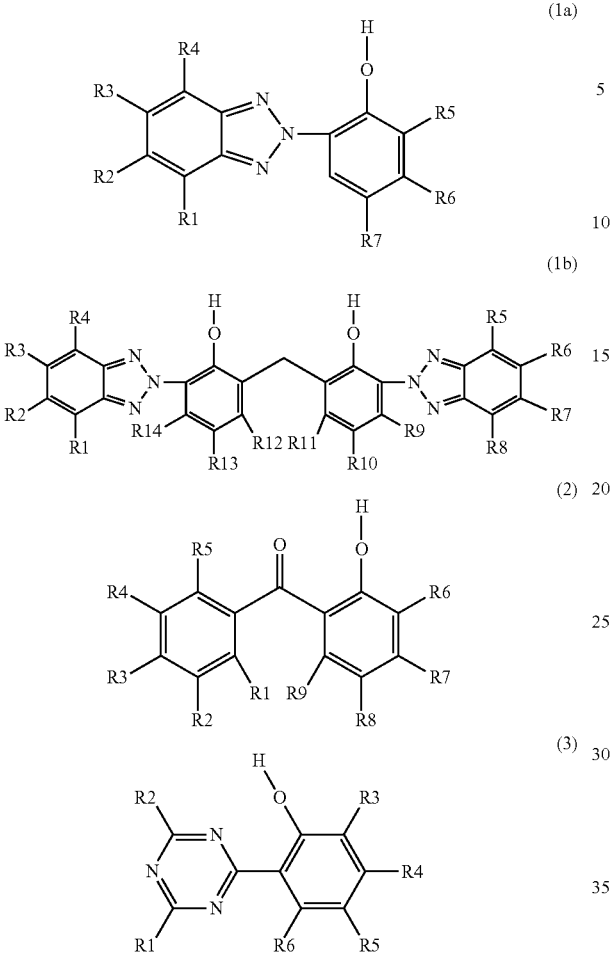

where R1, R2, R3, R4, R5, R6, R7, R8, R9, R10, R11, R12, R13, R14=H; halogen, or $C_{1-20}$ alkyl, $C_{1-20}$ hydroxyalkyl, $C_{1-20}$ alkoxyalkyl, or $C_{1-20}$ acyloxyalkyl groups, in each case optionally substituted by aldehyde, keto or epoxy groups, with the proviso that at least one of the groups R1, R2, R3, R4, R5, R6, R7, R8, R9, R10, R11, R12, R13, R14 carries a carboxyl, sulfoxy or phosphate group with an alkali metal ion, alkaline earth metal ion, or ammonium ion as a counterion.

2. The film of claim 1, wherein compounds of Formula (5)

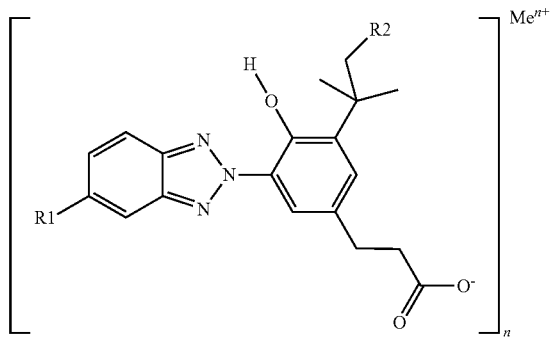

where R1=H or halogen, R2=H or $CH_3$, where $Me^{n+}=Li^+$, $Na^+$, $K^+$, $Mg^{2+}$, $Ca^{2+}$, $Zn^{2+}$, or $NH_4^+$, and n is the valence of metal $Me^{n+}$ are used as a UV absorber.

3. The film of claim 1, wherein the film contains less than 1500 ppm of antioxidants having the partial structure (3,5-di-tert-butyl-4-hydroxyphenyl)propionate or according to formula (6)

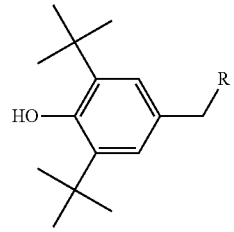

where R=a hydrocarbon radical of a polyfunctional alcohol, oligoglycol with 1 to 10 glycol units, a hydrocarbon group with 1 to 20 carbon atoms, an N, P, or S-substituted hydrocarbon group with 1 to 30 carbon atoms, or a carboxylic acid ester group with 1 to 30 carbon atoms in an alcohol group of the ester.

4. The film of claim 2, wherein the film contains less than 1500 ppm of antioxidants having the partial structure (3,5-di-tert-butyl-4-hydroxyphenyl)propionate or according to formula (6)

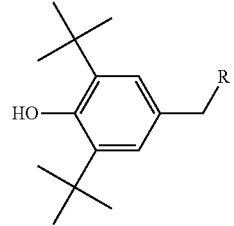

where R=a hydrocarbon radical of a polyfunctional alcohol, oligoglycol with 1 to 10 glycol units, a hydrocarbon group with 1 to 20 carbon atoms, an N, P, or S-substituted hydrocarbon group with 1 to 30 carbon atoms, or a carboxylic acid ester group with 1 to 30 carbon atoms in an alcohol group of the ester.

5. The films of claim 1, wherein the film has a yellowness value db of less than 2, determined on a laminate consisting of the film with a thickness of 0.76 mm between two panes of clear glass having a thickness of 2 mm.

6. The film of claim 1, wherein the films contain one or more metal ions of Be, Mg, Ca, Sr, Ba, Zn and Al in a proportion of more than 5 ppm.

7. The film of claim 1, wherein the film comprises at least one sterically hindered amine light stabiliser.

8. The film of claim 1, wherein the polyvinyl acetal has a polyvinyl alcohol content from 12 to 24% by weight.

9. A laminated glass laminates, comprising at least one film of claim 1 as a laminating film.

10. A museum glazing, display window glazing, motor vehicle glazing, aircraft glazing, photovoltaic modules, light emitting diode or organic light emitting diode screen, television, computer screen, big screen, electrochromic glass element, photochromic glass element, or photoelectrochromic glass element, comprising a laminate containing a film of claim 1 as a laminating film.

11. A method for producing a polyvinyl acetal film of claim 1, comprising mixing polyvinyl acetal, at least one plasticiser, and at least one UV absorber of Formula 1 in solid form in a mixing apparatus, and subsequently extruding the mixture thus obtained.

12. The method of claim 11, wherein the UV absorber is fed to the mixing apparatus suspended in a carrier liquid.

* * * * *